US010625717B2

(12) United States Patent
Yanai et al.

(10) Patent No.: US 10,625,717 B2
(45) Date of Patent: Apr. 21, 2020

(54) BRAKE CONTROL DEVICE, BRAKE CONTROL METHOD, TRAIN, AND PROGRAM

(71) Applicant: MITSUBISHI HEAVY INDUSTRIES ENGINEERING, LTD., Yokohama-shi, Kanagawa (JP)

(72) Inventors: Noritaka Yanai, Tokyo (JP); Hirotaka Okazaki, Tokyo (JP); Kazuyuki Wakasugi, Tokyo (JP); Yutaka Miyajima, Tokyo (JP)

(73) Assignee: MITSUBISHI HEAVY INDUSTRIES ENGINEERING, LTD., Yokohama-Shi, Kanagawa (JP)

( * ) Notice: Subject to any disclaimer, the term of this patent is extended or adjusted under 35 U.S.C. 154(b) by 69 days.

(21) Appl. No.: 15/777,084

(22) PCT Filed: Nov. 17, 2016

(86) PCT No.: PCT/JP2016/084102
§ 371 (c)(1),
(2) Date: May 17, 2018

(87) PCT Pub. No.: WO2017/090504
PCT Pub. Date: Jun. 1, 2017

(65) Prior Publication Data
US 2018/0326953 A1    Nov. 15, 2018

(30) Foreign Application Priority Data
Nov. 25, 2015    (JP) .................................. 2015-230112

(51) Int. Cl.
*B60T 8/17* (2006.01)
*B60T 13/74* (2006.01)
(Continued)

(52) U.S. Cl.
CPC .............. *B60T 8/1705* (2013.01); *B60L 7/18* (2013.01); *B60L 7/26* (2013.01); *B60L 9/00* (2013.01);
(Continued)

(58) Field of Classification Search
CPC ... B60T 8/17; B60T 8/00; B60T 13/74; B60L 7/26; B60L 7/24; B60L 7/22
See application file for complete search history.

(56) References Cited

U.S. PATENT DOCUMENTS 5,839,800 A * 11/1998 Koga ....................... B60K 6/46
303/152
5,927,829 A * 7/1999 Saga ....................... B60T 8/448
180/165
(Continued)

FOREIGN PATENT DOCUMENTS

EP    0032567 A1    7/1981
EP    0149493 A2    7/1985
(Continued)

OTHER PUBLICATIONS

PCT/ISA/210, "International Search Report for International Application No. PCT/JP2016/084102," dated Dec. 13, 2016.
(Continued)

*Primary Examiner* — Yuri Kan
(74) *Attorney, Agent, or Firm* — Manabu Kanesaka; Benjamin Hauptman; Kenneth Berner

(57) ABSTRACT

A brake control device includes a mechanical brake output determination unit configured to determine the stage number of a braking force on the basis of a target deceleration of a moving body from one or a plurality of braking force stages output from a mechanical brake included in the moving body, a mechanical braking force estimation unit configured to estimate braking force of the mechanical brake corre- (Continued)

sponding to the stage number determined by the mechanical brake output determination unit, and a regenerative brake control unit configured to output a regenerative brake command value such that a regenerative brake included in the moving body outputs a braking force corresponding to a difference between target braking force based on the target deceleration and the braking force estimated by the mechanical braking force estimation unit.

10 Claims, 9 Drawing Sheets

(51) Int. Cl.
*B60L 7/22* (2006.01)
*B60L 7/18* (2006.01)
*B60L 7/26* (2006.01)
*B60L 15/20* (2006.01)
*B60L 9/00* (2019.01)
*B60T 8/172* (2006.01)
*B61H 11/14* (2006.01)

(52) U.S. Cl.
CPC ............ *B60L 15/2009* (2013.01); *B60T 8/17* (2013.01); *B60T 8/172* (2013.01); *B61H 11/14* (2013.01); *B60L 2200/26* (2013.01); *B60L 2240/12* (2013.01); *B60L 2240/423* (2013.01); *B60L 2260/44* (2013.01); *B60T 2270/60* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 9,616,757 B2* | 4/2017 | Lee | B60L 58/12 |
| 9,669,808 B2* | 6/2017 | Abe | B60L 7/18 |
| 2004/0054450 A1* | 3/2004 | Nakamura | B60L 7/16 701/22 |
| 2011/0278913 A1* | 11/2011 | Kim | B60T 1/10 303/3 |
| 2016/0152158 A1 | 6/2016 | Yamashita et al. | |

FOREIGN PATENT DOCUMENTS

| | | | |
|---|---|---|---|
| EP | 758591 A1 * | 2/1997 | ............... B60L 7/24 |
| EP | 2623361 A1 | 8/2013 | |
| JP | H07-007806 A | 1/1995 | |
| JP | H08-251706 A | 9/1996 | |
| JP | H09-135501 A | 5/1997 | |
| JP | H09-308005 A | 11/1997 | |
| JP | 2001-028803 A | 1/2001 | |
| JP | 2003-092801 A | 3/2003 | |
| JP | 2005-033902 A | 2/2005 | |
| JP | 2006-205912 A | 8/2006 | |
| JP | 2008-005620 A | 1/2008 | |
| JP | 2012-075252 A | 4/2012 | |
| JP | 2015-139336 A | 7/2015 | |
| WO | 2015/019405 A1 | 2/2015 | |

OTHER PUBLICATIONS

PCT/ISA/237, "Written Opinion of the International Searching Authority for International Application No. PCT/JP2016/084102," dated Dec. 13, 2016.

* cited by examiner

BRAKE CONTROL DEVICE, BRAKE CONTROL METHOD, TRAIN, AND PROGRAM

TECHNICAL FIELD

The present disclosure relates to a brake control device for a train, a brake control method, a train, and a program.

Priority is claimed on Japanese Patent Application No. 2015-230112, filed Nov. 25, 2015, the content of which is incorporated herein by reference.

BACKGROUND ART

In a braking system for a train, it is usual to use a regenerative brake for energy saving or prevention of abrasion of brake pads. A regenerative brake is a type of electric brake that obtains a reverse driving force (braking force) by causing a motor to function as a power generator and also transfers the obtained power to other trains. When a regenerative brake is used, a command for the regenerative brake is given from an automatic train-driving device included in the train to an inverter. The inverter generates a torque which has been instructed for the motor according to vector control or the like. The power generated at the time of executing regenerative braking is supplied to other trains via overhead lines. However, in this case, when there is no load such as a train serving as a transfer destination or when there is a relatively small load, an overhead wire voltage becomes high. In this case, in order to prevent damage to devices due to an excessive increase in the overhead wire voltage, control is performed in order to reduce the braking force of the regenerative braking and curtail increase in the overhead wire voltage. A state in which the motor does not generate a torque as instructed as a result of such curtailment control is referred to as regeneration invalidation.

When regeneration invalidation occurs, the braking force may become insufficient, and therefore, there is a control called electropneumatic blending control for compensating for this insufficiency using an air brake, which is a type of mechanical brake. For example, Patent Literature 1 describes an example of electropneumatic blending control. Patent Literature 1 describes a brake control method for adopting a smaller of a brake torque command value and a calculated value of a regenerative braking force as a value of the regenerative braking force when compensating for a difference between the brake torque command value corresponding to a required total braking force and the regenerative braking force using an air brake.

CITATION LIST

Patent Literature

[Patent Literature 1]
  Japanese Unexamined Patent Application, First Publication No. H 9-135501

SUMMARY

However, in the electropneumatic blending control of the related art including the brake control method described in Patent Literature 1, since control of the air brake is started after regenerative brake control in an inverter, a response lag occurs in the control of the air brake. Therefore, the accuracy of tracking of a target speed in automatic driving deteriorates. In the air brake control, a braking force is obtained by pressing brake pads against brake shoes using air pressure. However, in the air brake control of the related art, since adjustment of the air pressure is performed in non-stages, a calculation load required for control of the air pressure is high and a high-performance control device dedicated to braking is required.

The present disclosure provides a brake control device, a brake control method, a train, and a program capable of solving the above-described problems.

According to the first aspect of the present invention, a brake control device includes a mechanical brake output determination unit configured to determine a stage number of a braking force on the basis of a target deceleration of a moving body from one or a plurality of braking force stages output from a mechanical brake included in the moving body; a mechanical braking force estimation unit configured to estimate a braking force of the mechanical brake corresponding to the stage number determined by the mechanical brake output determination unit; and a regenerative brake control unit configured to output a regenerative brake command value such that a regenerative brake included in the moving body outputs a braking force corresponding to a difference between a target braking force based on the target deceleration and the braking force estimated by the mechanical braking force estimation unit.

According to a second aspect of the present invention, the mechanical braking force estimation unit is configured to estimate a braking force of the mechanical brake on the basis of a model equation using characteristics information of the mechanical brake.

According to a third aspect of the present invention, the mechanical braking force estimation unit is configured to estimate the braking force of the mechanical brake on the basis of an acceleration of the moving body and a pulling force of a motor related to the regenerative brake.

According to a fourth aspect of the present invention, the brake control device further includes a regeneration invalidation prediction unit configured to perform prediction as to whether or not regeneration invalidation will occur, and the regenerative brake control unit is configured to output a regenerative brake command value for obtaining a braking force corresponding to the target braking force when the regeneration invalidation prediction unit does not predict the occurrence of regeneration invalidation, and to output a regenerative brake command value for obtaining a braking force corresponding to a difference between the target braking force and the estimated braking force when the regeneration invalidation prediction unit predicts the occurrence of regeneration invalidation.

According to a fifth aspect of the present invention, the regeneration invalidation prediction unit is configured to compare a voltage of an output destination of regenerative power of the regenerative brake with a predetermined threshold value and to predict that regeneration invalidation will occur when a difference between the voltage of the output destination and the predetermined threshold value falls within a predetermined range.

According to a sixth aspect of the present invention, the regeneration invalidation prediction unit is configured to predict whether or not regeneration invalidation will occur using a ratio of regenerative power based on the regenerative brake command value output by the regenerative brake control unit to a peak value of the regenerative power.

According to a seventh aspect of the present invention, the mechanical brake output determination unit is configured to determine the stage number according to a criterion determined so that regeneration invalidation does not occur as a result of control of the regenerative brake in the regenerative brake control unit.

According to an eighth aspect of the present invention, the mechanical brake output determination unit is configured to determine the stage number when the target braking force is equal to or greater than a predetermined proportion to a total braking force that is able to be output by the regenerative brake and the mechanical brake.

According to a ninth aspect of the present invention, the train includes the above-described brake control device.

According to a tenth aspect of the present invention, a brake control method includes: determining the stage number of a braking force on the basis of a target deceleration of a moving body from one or a plurality of braking force stages output from a mechanical brake included in the moving body; estimating a braking force of the mechanical brake corresponding to the determined stage number; and outputting a regenerative brake command value such that a regenerative brake included in the moving body outputs a braking force corresponding to a difference between a target braking force based on the target deceleration and the estimated braking force.

According to an eleventh aspect of the present invention, a program causes a computer included in a brake control device to function as: means for determining a stage number of a braking force on the basis of a target deceleration of a moving body from one or a plurality of braking force stages output from a mechanical brake included in the moving body; means for estimating a braking force of the mechanical brake corresponding to the determined stage number; and means for outputting a regenerative brake command value such that a regenerative brake included in the moving body outputs a braking force corresponding to a difference between a target braking force based on the target deceleration and the estimated braking force.

According to the brake control device, the brake control method, the train, and the program described above, it is possible to reduce the response lag of the air brake while using a control device that is lower in cost than a control device of the related art, and accordingly, to improve accuracy of tracking of a target speed in automatic driving.

DESCRIPTION OF EMBODIMENTS

First Embodiment

Hereinafter, a brake control device for a train according to a first embodiment of the present invention will be described with reference to FIGS. 1 to 3.

Figure 1:
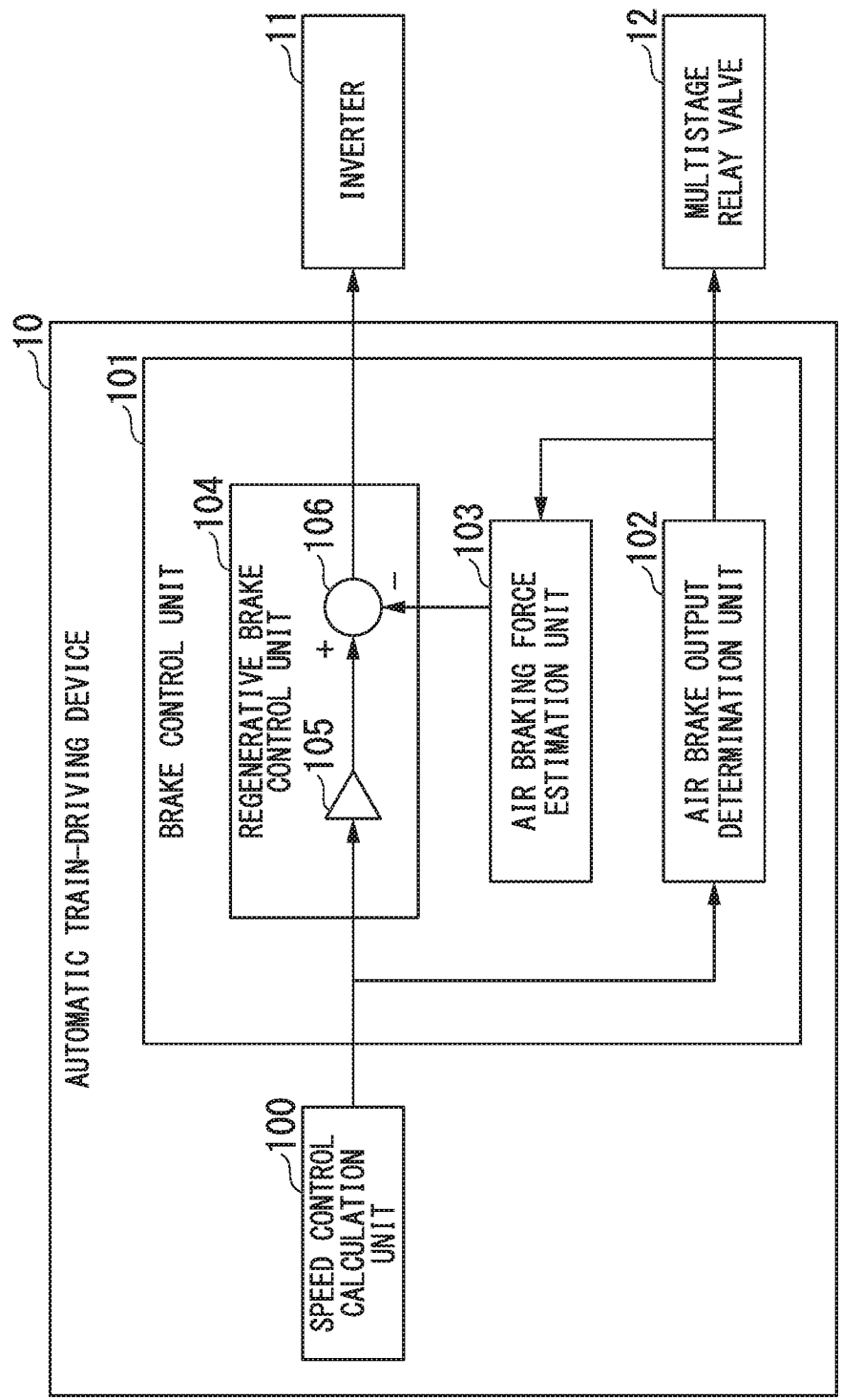
FIG. 1 is a functional block diagram illustrating an example of a brake control device according to a first embodiment of the present invention.

FIG. 1 is a functional block diagram illustrating an example of a brake control device according to a first embodiment of the present invention.

An automatic train-driving device 10 is a device that is mounted on a train and automates driving of the train. As illustrated in FIG. 1, the automatic train-driving device 10 includes a speed control calculation unit 100 and a brake control unit 101. The speed control calculation unit 100 occasionally calculates a target speed of the train when automatically driving the train. For example, when the train approaches a train station or a train traveling in front of the train, the speed control calculation unit 100 calculates a target deceleration and outputs the target deceleration to the brake control unit 101. The brake control unit 101 performs brake control based on the target deceleration and decelerates the train. In the first embodiment, description will be given using a case in which an operation of a regenerative brake and an air brake is controlled as an example of brake control. When the speed control calculation unit 100 instructs the brake control unit 101 to decelerate the train, the speed control calculation unit 100 may perform an instruction according to a unit called a "notch" instead of the target deceleration.

The brake control unit 101 controls operations of the regenerative brake and the air brake such that the train is decelerated or stopped according to the target deceleration. Specifically, the brake control unit 101 gives a command for the regenerative brake (referred to as a regenerative brake command value) to an inverter 11 according to a brake notch command value or a torque command value. The inverter 11 generates a desired torque in a motor serving as a power source of the train according to vector control or the like and obtains a braking force for the regenerative brake (a regenerative braking force). The brake control unit 101 controls a multistage relay valve 12 to obtain a braking force for an air brake (an air braking force). Specifically, the brake control unit 101 adjusts the stage number of the multistage relay valve 12 to supply desired compressed air and drive a brake cylinder. The brake cylinder presses brake pads against wheels. This creates the air braking force. In particular, the brake control unit 101 of this embodiment may predict an insufficient braking force when the regenerative brake is operated in advance so that regeneration invalidation does not occur and operate the air brake in advance to compensate for the insufficient regenerative braking force. The automatic train-driving device 10 also has various other functions, but description of configurations not related to the embodiment will be omitted.

The brake control unit 101 includes an air brake output determination unit 102, an air braking force estimation unit 103, and a regenerative brake control unit 104.

The air brake output determination unit 102 determines a stage number of a braking force on the basis of the target deceleration of the train from among one or a plurality of braking force stages output by the air brake included in the train. More specifically, the air brake output determination unit 102 determines the stage number according to a desired braking force from one or a plurality of braking force stages on the basis of the target deceleration (or "notch") of the train in the air brake that changes the amount of air to be supplied to the brake cylinder in stages by switching the stage number of the multistage relay valve 12 and obtains braking force corresponding to the stage number.

The air braking force estimation unit 103 estimates a braking force (an estimated air braking force) that is obtained when the air brake is operated with the stage number determined by the air brake output determination unit 102.

The regenerative brake control unit 104 operates the regenerative brake to obtain a regenerative braking force. In particular, in the first embodiment, the regenerative brake control unit 104 calculates the target braking force based on the target deceleration and outputs a regenerative brake command value to the inverter 11 such that the braking force corresponding to a difference between the calculated target braking force and the estimated air braking force estimated by the air braking force estimation unit 103 can be obtained. The regenerative brake control unit 104 includes a target braking force calculation unit 105 and a difference calculation unit 106.

The target braking force calculation unit 105 calculates the target braking force based on the target deceleration, that is, a total braking force required to achieve the target deceleration.

The difference calculation unit 106 calculates the difference between the target braking force calculated by the target braking force calculation unit 105 and the estimated air braking force estimated by the air braking force estimation unit 103.

Figure 2:
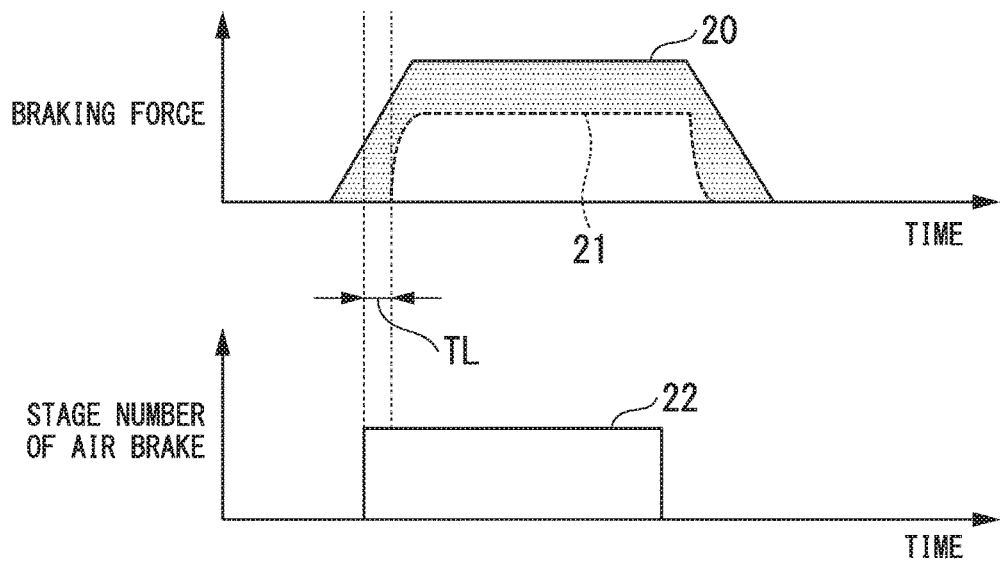
FIG. 2 is a diagram illustrating an operation of the brake control device according to the first embodiment of the present invention.

FIG. 2 is a diagram illustrating an operation of the brake control device according to the first embodiment of the present invention.

The upper diagram of FIG. 2 is a diagram illustrating a relationship between the target braking force, the regenerative braking force, and the estimated air braking force in the first embodiment. In the upper diagram of FIG. 2, the vertical axis indicates the braking force and the horizontal axis indicates time. A graph 20 is a graph showing a transition of the target braking force required to achieve the target deceleration of the train calculated by the speed control calculation unit 100. The target braking force calculation unit 105 obtains the target braking force from the target deceleration calculated by the speed control calculation unit 100, a train weight, and the like. Graph 21 is a graph showing a transition of the estimated air braking force estimated by the air braking force estimation unit 103. A shaded portion surrounded by the graph 20 and the graph 21 corresponds to the regenerative braking force calculated by the difference calculation unit 106.

The lower diagram of FIG. 2 is a diagram illustrating a transition of the stage number of the air brake in the first embodiment. Since the air braking force can be changed in stages by switching the stage number of the multistage relay valve 12, the stage number of the multistage relay valve 12 determined by the air brake output determination unit 102 is called the stage number of the air brake. In the lower diagram of FIG. 2, the vertical axis indicates the stage number of the air brake and the horizontal axis indicates time. A graph 22 is a graph showing a temporal transition of the stage number of the air brake corresponding to the transition of the estimated air braking force indicated by the graph 21. The air brake output determination unit 102 determines the stage number of the air brake on the basis of the target deceleration of the train calculated by the speed control calculation unit 100. The air brake output determination unit 102 instructs the stage number of the air brake to the multistage relay valve 12, and the multistage relay valve 12 supplies an air pressure corresponding to the instructed stage number to the brake cylinder. Three command lines to the multistage relay valve 12, for example, are provided. In this case, eight signals ($2^3=8$) can be output by three command lines, and the amount of air can be switched in seven stages (one remaining stage is off). When the air brake output determination unit 102 instructs any one of the seven stages to the multistage relay valve 12, an air braking force corresponding to this stage is obtained. For example, when a larger amount of air is supplied, the brake cylinder presses the brake pads against the wheels with a stronger force, and therefore, the braking force increases. Examples of the stage number may merely be ON (applying the air brake) and OFF (not applying the air brake). In this case, the stage of air braking force is stage 1. In the first embodiment, there are not necessarily plural air braking force stage numbers.

The air brake output determination unit 102 may determine the stage number of the air brake so that the target braking force required to achieve the target deceleration can be obtained or may determine the stage number of the air brake so that an air braking force smaller than the target braking force is obtained on the premise of joint use of the regenerative brake. Attempting to achieve the target braking force only through the operation of the regenerative brake when the target braking force is large is likely to cause regeneration invalidation. Accordingly, the air brake output determination unit 102 determines the stage number according to a predetermined criterion determined so that no regeneration invalidation occurs. For example, the air brake output determination unit 102 may determine the stage number such that the air brake is responsible for 30% of the target braking force. Alternatively, only when the target braking force exceeds 50% of a total braking force (a maximum value of braking force obtained by the regenerative brake and the air brake), the air brake output determination unit 102 may determine the stage number so that 30% of the target braking force can be obtained by the air brake. In any of these cases, it is known from pre-experiments, simulations, or the like that the occurrence of regeneration invalidation can be prevented if the air brake is responsible for 30% of the target braking force. The air brake output determination unit 102 performs the determination of the stage number as shown by the graph 22 in the lower diagram of FIG. 2, and outputs a result of the determination to the air braking force estimation unit 103. The air brake output determination unit 102 instructs the determined stage number to the multistage relay valve 12.

The air braking force estimation unit 103 estimates the air braking force when the multistage relay valve 12 is controlled such that it has the stage number determined by the air brake output determination unit 102 using a model equation for an air braking force in which characteristics information of the air brake (a dead time, a time constant, a friction coefficient, or the like) is used. The air braking force estimation unit 103 calculates the estimated air braking force using the following equation, for example.

[Math. 1]

$$\hat{F}_b(t) = a_{2i}v(t)^2 + a_{1i}v(t) + a_{0i} \quad (1)$$

$\hat{F}_b(t)$ is indicated by F^$_b$(t) in the specification.

[Math. 2]

$$\dot{F}_b(t) = \frac{\hat{F}_b(t - T_d) - F_b(t)}{T_c} \quad (2)$$

$\dot{F}_b(t)$ is indicated by F^$_b$(t) in the specification.

Here, F^$_b$(t) is the air braking force in a steady state and is defined as a quadratic function of the speed as shown in Equation (1), for example. v(t) is a speed of the train at time t, and coefficients $a_{2i}$, $a_{1i}$, and $a_{0i}$ are coefficients when the stage number determined by the air brake output determination unit 102 is i. $F_b(t)$ is an expected value of the actually generated air braking force and is determined by a predetermined dead time $T_d$ and a predetermined first-order lag time constant $T_c$. F^$_b$(t) is an equation obtained by differentiating $F_b(t)$ at time t. The air braking force estimation unit 103 solves Equations (1) and (2) to obtain $F_b(t)$ that is the estimated air braking force. The graph 21 in the upper diagram of FIG. 2 is an example of $F_b(t)$.

The air braking force estimation unit 103 outputs the calculated estimated air braking force to the regenerative brake control unit 104. In the regenerative brake control unit 104, the difference calculation unit 106 calculates the difference between the target braking force calculated by the target braking force calculation unit 105 and the estimated air braking force estimated by the air braking force estimation unit 103. In the upper diagram of FIG. 2, a shaded portion surrounded by the graph 20 and the graph 21 indicates the difference between the target braking force and the estimated air braking force. The regenerative brake control unit 104 generates a regenerative brake command value so that braking force corresponding to the difference calculated by the difference calculation unit 106 is obtained, and outputs the command value to the inverter 11.

It can be seen from a comparison between the graph 21 in the upper graph of FIG. 2 and the graph 22 in the lower diagram of FIG. 2 that there is a time lag (TL) in the graph 21. This indicates that a lag occurs before the air brake actually operates after the air brake output determination unit 102 determines the stage number and outputs the stage number to the multistage relay valve 12. However, since the control of the air brake is performed prior to the control of the regenerative brake as described below, it is possible to reduce a response lag after the deceleration command is issued from the speed control calculation unit 100.

Here, a method of controlling the regenerative brake and the air brake performed in the related art will be compared with the brake control method of the first embodiment.

Figure 11:
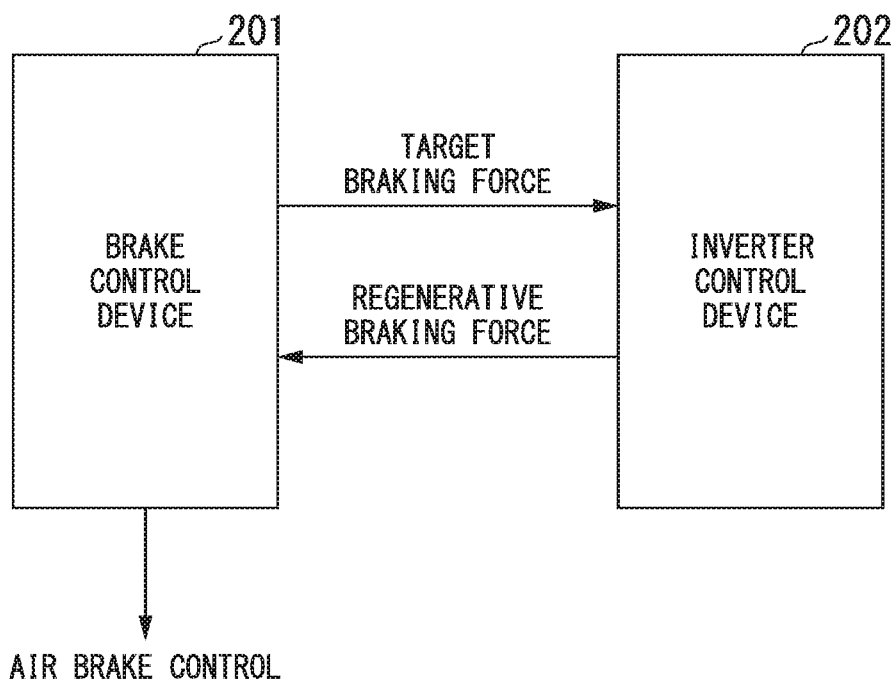
FIG. 11 is a diagram illustrating an operation of a brake control device of the related art.

FIG. 11 is a diagram illustrating an operation of a brake control device of the related art. In the method of the related art, first, the brake control device 201 calculates target braking force on the basis of a target deceleration of the train. The brake control device 201 outputs the calculated target braking force to an inverter control device 202. Then, the inverter control device 202 controls an inverter by generating a regenerative brake command value on the basis of the target braking force calculated by the brake control device 201. The inverter control device 202 calculates a regenerative braking force that is obtained using the generated regenerative brake command value. Then, the inverter control device 202 returns the calculated regenerative braking force to the brake control device 201. The brake control device 201 calculates a difference between the previously calculated target braking force and the regenerative braking force obtained from the inverter control device 202 and performs control to compensate for an insufficient regenerative braking force using the air brake when a result of the calculation is positive (when the braking force is insufficient with the regenerative brake only).

In the case of this control of the related art, it is necessary to pass through the process in the inverter control device 202 in order to perform control of the regenerative brake before the control of the air brake is performed. Therefore, in the control of the air brake, a response lag occurs. In the related art, since the amount of air to be supplied to the brake cylinder is finely adjusted in order to perform adjustment of the output of the air brake in non-stages (high resolution), a calculation load on the brake control device 201 is high and the brake control device 201 is also costly.

On the other hand, in the first embodiment, the stage number of the air brake is determined before control of the regenerative brake is performed so that regeneration invalidation does not occur on the basis of the target deceleration of the train calculated by the speed control calculation unit 100. Thereafter, the regenerative brake is operated in consideration of the air braking force according to the determined stage number of the air brake. According to the first embodiment, since the air brake is operated before the regeneration invalidation, a proportion of the braking force dependent on the regenerative brake can be reduced and an excessive increase in the overhead wire voltage can be curtailed at the time of a regenerative braking operation. This can prevent the occurrence of regeneration invalidation. In the control of the air brake, since the process of the regenerative brake control device is not relayed, the response lag is reduced and accuracy of tracking of the target speed in automatic driving is improved.

In the control of the air brake of the related art, a magnitude of the air braking force is often controlled in non-stages in order to compensate for an insufficient regenerative braking force. In the case of such a control, since the amount of air to be supplied to the brake cylinder is controlled in non-stages (high resolution), the amount of calculation increases and a high-performance control device is required. On the other hand, in the first embodiment, since for the air braking force, it is merely necessary for one stage number to be determined from among one or a plurality of predetermined stages on the basis of a criterion determined so that the regeneration invalidation does not occur, a control device with high calculation capability is not necessary. The obtained air braking force has stages, but since the control of the inverter 11 can be performed in non-stages as in the related art, the braking force in non-stages can be obtained in a total braking force, which is a sum of the regenerative braking force and the air braking force. Accordingly, the train can be decelerated smoothly as in the related art.

Next, a flow of the brake control process according to the first embodiment will be described.

Figure 3:
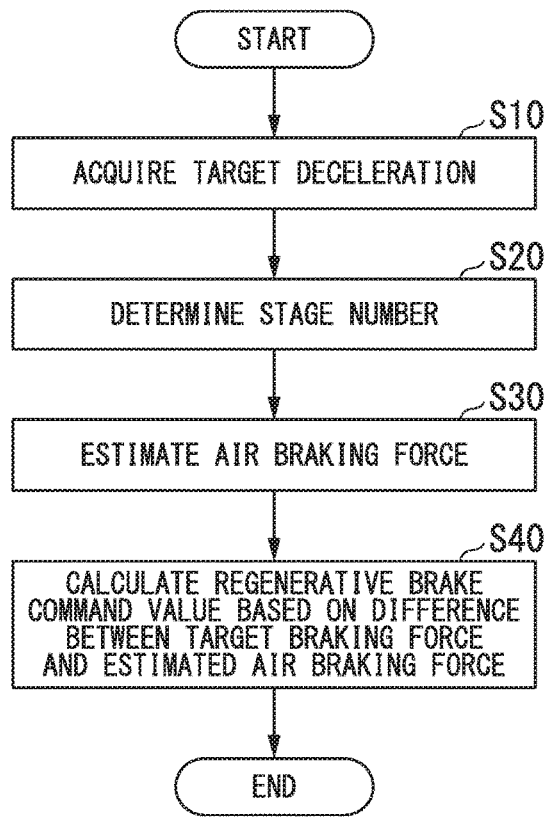
FIG. 3 is a flowchart illustrating an example of control of the brake control device according to the first embodiment of the present invention.

FIG. 3 is a flowchart illustrating an example of control of the brake control device according to the first embodiment of the present invention.

The speed control calculation unit 100 included in the automatic train-driving device 10 is assumed to calculate the target speed or the target acceleration of the train on the basis of a traveling pattern of the train or the like. Control of traveling of the train that does not require the brake control is assumed to be performed according to the target speed or the like by functional units not illustrated in FIG. 1, which are included in the automatic train-driving device 10. Hereinafter, the process will be described on the assumption that the speed control calculation unit 100 has calculated a minus acceleration (a target deceleration) for a reason such as the train approaching a stopping station.

The speed control calculation unit 100 outputs the calculated target deceleration to the brake control unit 101. In the brake control unit 101, the air brake output determination unit 102 and the regenerative brake control unit 104 acquire the target deceleration (step S10).

Then, the air brake output determination unit 102 determines the stage number of the air brake according to the target deceleration (step S20). For example, a correspondence relationship between the target deceleration and the stage number of the air brake is defined in a storage unit (not illustrated) of the brake control unit 101, and the air brake output determination unit 102 determines the stage number on the basis of the correspondence relationship. The air brake output determination unit 102 outputs the determined stage number to the air braking force estimation unit 103. The air brake output determination unit 102 controls the multistage relay valve 12 according to the determined stage number and starts an operation of the air brake in advance.

On the other hand, in the regenerative brake control unit 104, the target braking force calculation unit 105 calculates the target braking force according to the target deceleration. For the target braking force, for example, the target braking force calculation unit 105 calculates the target braking force on the basis of a correspondence relationship between the target deceleration and the target braking force stored in the storage unit.

Then, the air braking force estimation unit 103 estimates the air braking force according to the acquired stage number (step S30). For example, the air braking force estimation unit 103 reads coefficients $a_{2i}$, $a_{1i}$, and $a_{0i}$ (i is the stage number) according to the stage number and coefficients $T_d$ and $T_c$ from the storage unit and obtains the estimated air braking force according to Equations (1) and (2) described above. The air braking force estimation unit 103 outputs the obtained estimated air braking force to the regenerative brake control unit 104.

In the regenerative brake control unit 104, the difference calculation unit 106 subtracts the estimated air braking force from the previously calculated target braking force to obtain a difference. When the difference is positive, the regenerative brake control unit 104 calculates a regenerative brake command value based on the braking force indicated by the difference on the basis of the difference (step S40). The regenerative brake control unit 104 outputs the regenerative brake command value to the inverter 11. The inverter 11 generates a torque in the motor to operate the regenerative brake.

According to the brake control unit 101 of the first embodiment, since the air brake is operated without waiting for the regeneration invalidation, the occurrence of the regeneration invalidation can be prevented. Even when a resolution of the air brake is low, this can be compensated for with the regenerative brake, and therefore, it is possible to use a relatively inexpensive valve (such as the multistage relay valve 12) capable of switching the pressure in stages. Since it is unnecessary to perform the air brake control at a high resolution (non-stages), it is possible to reduce the number of functions of and costs incurred for an air brake control device. Since the air brake control is started without waiting for the control of the regenerative brake, the response lag is reduced. The response lag caused by the operation of the air brake can be compensated for by the output of the regenerative brake. Since the non-stepwise control can be performed with a total braking force including the braking force of the regenerative brake even when the output of the air braking force is stepwise, it is possible to perform smooth deceleration as in the related art.

Second Embodiment

Next, a brake control device for a train according to a second embodiment of the present invention will be described with reference to FIGS. 4 to 8.

Figure 4:
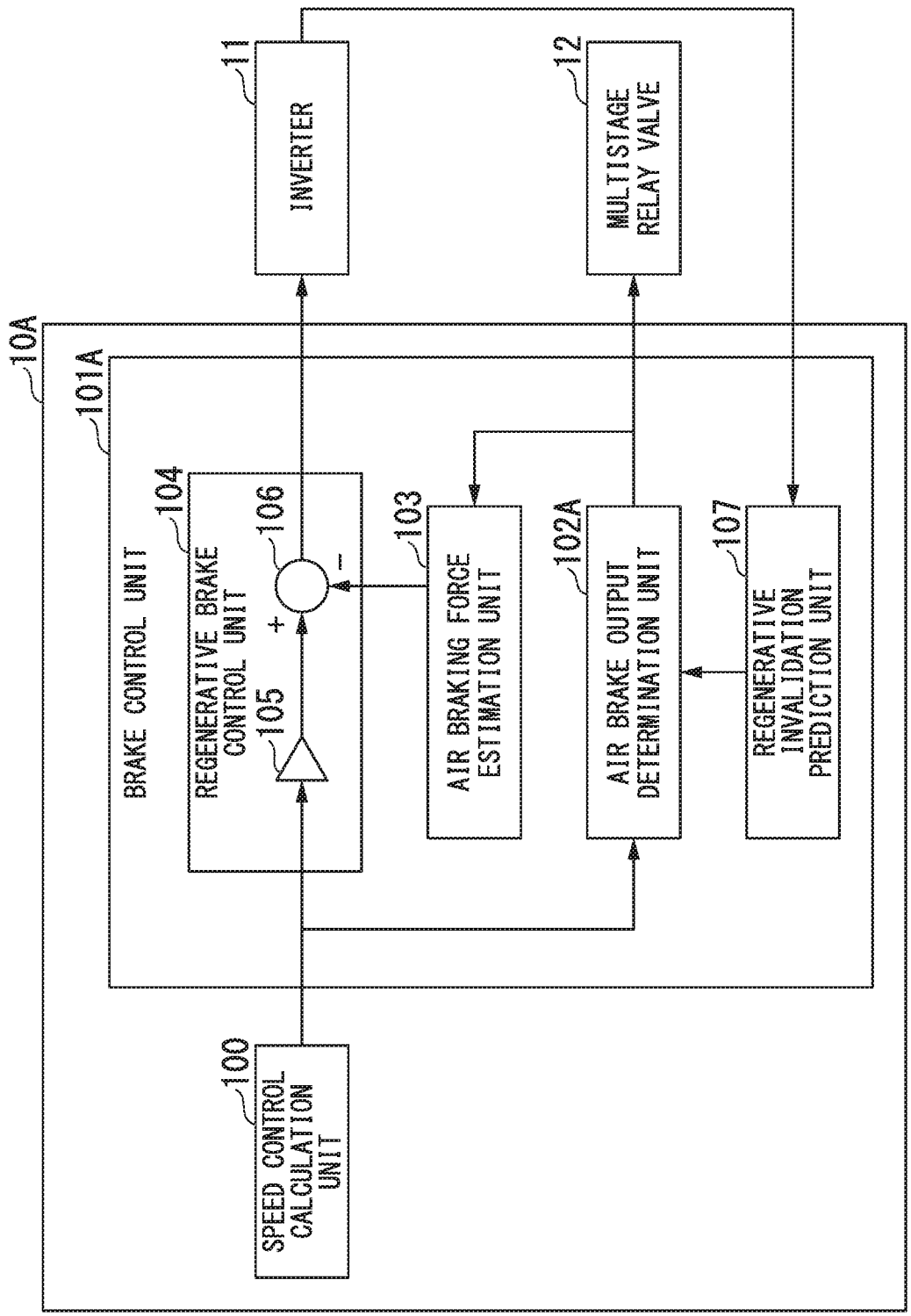
FIG. 4 is a functional block diagram illustrating an example of a brake control device according to a second embodiment of the present invention.

FIG. 4 is a functional block diagram illustrating an example of the brake control device according to the second embodiment of the present invention.

In a configuration according to the second embodiment, functional units the same as functional units constituting the automatic train-driving device 10 according to the first embodiment of the present invention are denoted by the same reference numerals, and description thereof will be omitted.

An automatic train-driving device 10A in the second embodiment includes a speed control calculation unit 100 and a brake control unit 101A. The brake control unit 101A includes an air brake output determination unit 102A, an air braking force estimation unit 103, a regenerative brake control unit 104, and a regeneration invalidation prediction unit 107. The regenerative brake control unit 104 includes a target braking force calculation unit 105 and a difference calculation unit 106.

The brake control unit 101A is different from that in the first embodiment in that the brake control unit 101A includes the regeneration invalidation prediction unit 107. The regeneration invalidation prediction unit 107 acquires a value of a voltage of an overhead wire that is an output destination of the power generated by a regenerative braking system from the inverter 11 and compares the overhead wire voltage with a predetermined threshold value. When a difference between the overhead wire voltage and the predetermined threshold value falls within a predetermined range, the regeneration invalidation prediction unit 107 predicts that regeneration invalidation will occur. The predetermined threshold value is, for example, a threshold value that is used for a determination as to whether regeneration refinement control is to be performed.

The air brake output determination unit 102A determines the stage number of the air brake only when the regeneration invalidation prediction unit 107 has predicted that the regeneration invalidation will occur. From this viewpoint, the air brake output determination unit 102A is different from the air brake output determination unit 102 of the first embodiment.

In a regenerative braking system, a regenerative resistance device is often provided so that regeneration invalidation does not occur even when there is no other power traveling vehicle that supplies the power generated at the time of execution of regenerative braking. In such a case, regeneration invalidation occurs only in cases in which adverse conditions such as a malfunction such as failure of the regenerative resistance device or simultaneous regeneration of multiple trains occur. In the second embodiment, since the overhead wire voltage increases in such adverse conditions, the overhead wire voltage is monitored. When the overhead wire voltage reaches a dangerous level, control of operating the air brake is performed.

Figure 5:
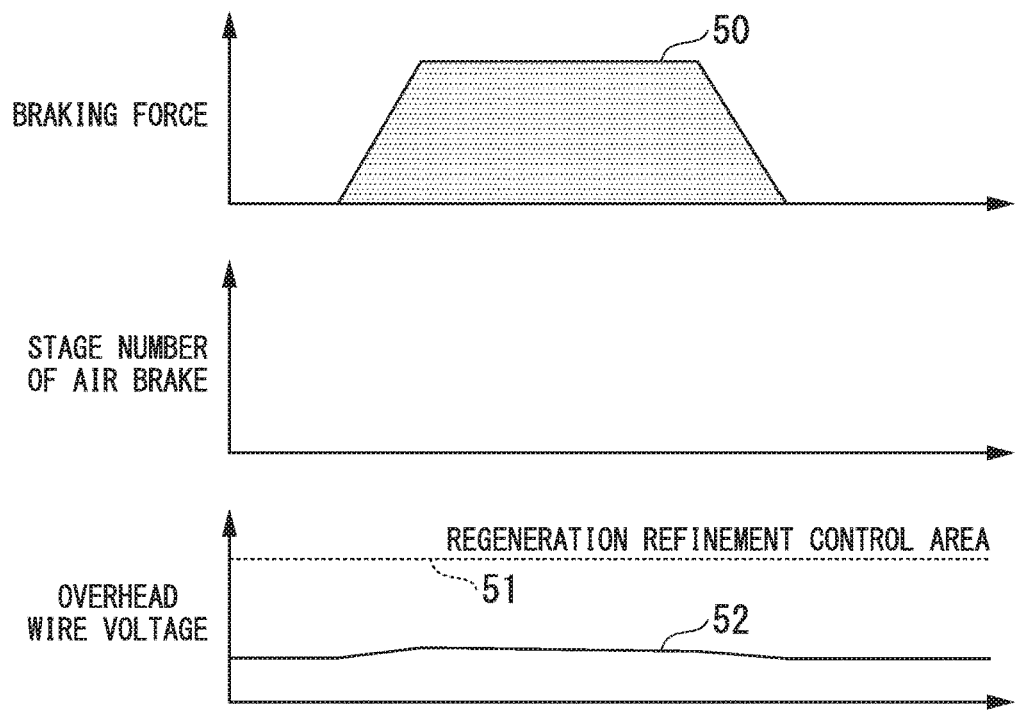
FIG. 5 is a first diagram illustrating an operation of the brake control device according to the second embodiment of the present invention.

FIG. 5 is a first diagram illustrating an operation of the brake control device according to the second embodiment of the present invention.

FIG. 5 is a diagram illustrating a relationship between the target braking force, the stage number of the air brake, and the overhead wire voltage in a normal state. The normal state refers to a state in which there is no occurrence of regeneration invalidation.

In an upper diagram of FIG. 5, the vertical axis indicates the braking force and the horizontal axis indicates time. A graph 50 shows a temporal transition of the target braking force calculated by the target braking force calculation unit 105.

In the middle diagram of FIG. 5, the vertical axis indicates the stage number of the air brake and the horizontal axis indicates time. In the case of the middle diagram of FIG. 5, the stage number of the air brake is always "0". This means that the air brake is not being operated.

In the lower diagram of FIG. 5, the vertical axis indicates the overhead wire voltage and the horizontal axis indicates time. A threshold value 51 is, for example, a threshold value for determining the occurrence of the regeneration invalidation. When the overhead wire voltage exceeds the threshold value 51, the regenerative brake control unit 104 performs "regeneration refinement control" to reduce the regenerative braking force and curtail an increase in the overhead wire voltage in order to prevent damage to the device due to an excessive increase in the overhead wire voltage. When the regenerative brake control unit 104 performs the regeneration refinement control, the regeneration invalidation occurs. The regeneration invalidation prediction unit 107 monitors the overhead wire voltage and predicts that the regeneration invalidation will occur when the overhead wire voltage approaches the threshold value 51. A graph 52 shows a transition of overhead wire voltage. In the case of the lower diagram of FIG. 5, the graph 52 is stable and shows a value lower than the threshold value 51. When the overhead wire voltage exhibits such a behavior, the regeneration invalidation prediction unit 107 predicts that no regeneration invalidation will occur. According to this prediction, the air brake output determination unit 102A determines that the stage number of the air brake is "0" (the air brake is not applied). The middle diagram of FIG. 5 shows that since the occurrence of the regeneration invalidation is not predicted, the air brake output determination unit 102A determines that the stage number of the air brake is "0".

Figure 6:
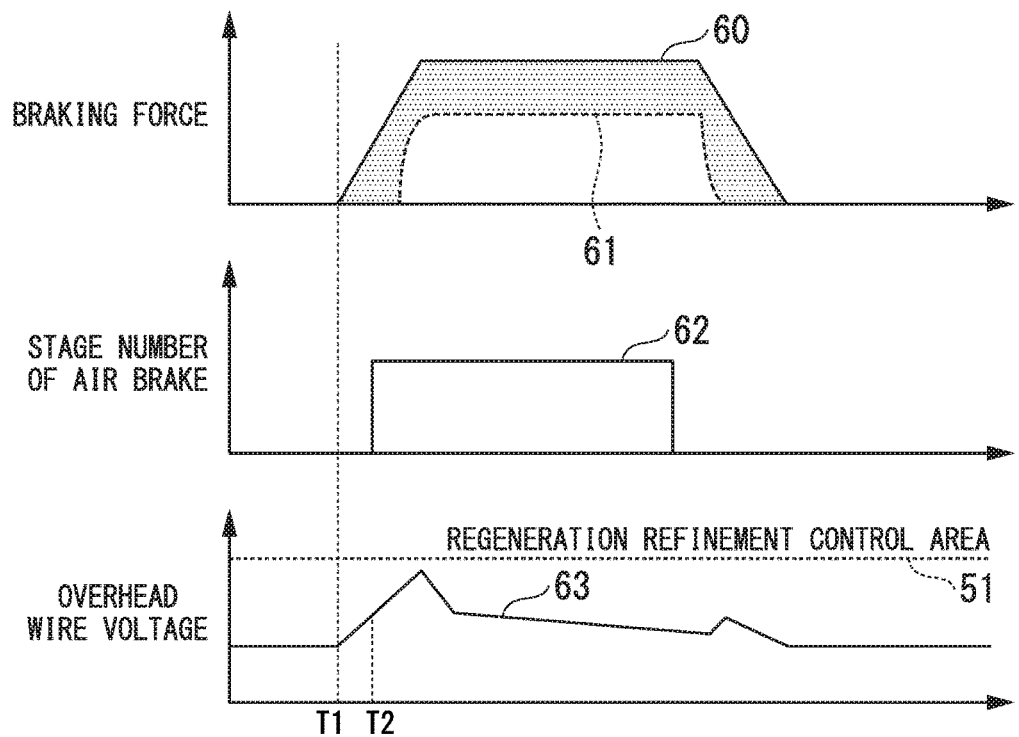
FIG. 6 is a second diagram illustrating an operation of the brake control device according to the second embodiment of the present invention.

FIG. 6 is a second diagram illustrating the operation of the brake control device according to the second embodiment of the present invention.

FIG. 6 is a diagram illustrating a relationship between the target braking force, the stage number of the air brake, and the overhead wire voltage in an abnormal state. The abnormal state refers to a state in which the regeneration invalidation is likely to occur.

Graphs of the upper diagram of FIG. 6, the middle diagram of FIG. 6, and the bottom diagram of FIG. 6 will be referred to as in the graphs of the upper diagram of FIG. 5, the middle diagram of FIG. 5, and the bottom diagram of FIG. 5. That is, the graph 60 shows the target braking force, the graph 61 shows the estimated air braking force, the graph 62 shows the stage number of the air brake, and the graph 63 shows the overhead wire voltage. In the upper diagram of FIG. 6, the operation of the regenerative brake is started at time T1. It can be seen from the lower diagram of FIG. 6 that the overhead wire voltage increases due to the regenerative power generated by the operation of the regenerative brake. Such a state occurs, for example, when the above-described adverse conditions are established. The regeneration invalidation prediction unit 107, for example, predicts that the regeneration invalidation will occur on the basis of the fact that the difference between the overhead wire voltage and the threshold value 51 at time T2 falls within a predetermined range. The regeneration invalidation prediction unit 107 outputs a result of the prediction to the air brake output determination unit 102A. When the air brake output determination unit 102A acquires the prediction result indicating that the regeneration invalidation will occur, the air brake output determination unit 102A determines the stage number of the air brake (the graph 62), as in the first embodiment. For example, as will be described below, the air brake output determination unit 102A may acquire the value of the overhead wire voltage together with the prediction result of the regeneration invalidation from the regeneration invalidation prediction unit 107 and determine the stage number of the air brake according to the overhead wire voltage. The air braking force estimation unit 103 estimates the estimated air braking force (the graph 61), and the difference calculation unit 106 in the regenerative brake control unit 104 subtracts the estimated air braking force from the target braking force to obtain the difference (a shaded portion between the graph 60 and the graph 61).

Although an example in which it is predicted that the regeneration invalidation will occur on the basis of the fact that the difference between the overhead line voltage being monitored and the threshold value 51 falls within the predetermined range has been described as a prediction method in the regeneration invalidation prediction unit 107, a rate of increase in the overhead wire voltage may be calculated and it may be predicted that the regeneration invalidation will occur when the rate of the increase becomes equal to or higher than a predetermined threshold value, for example. Alternatively, it may be predicted that the regeneration invalidation will occur when the overhead wire voltage becomes a value within a predetermined range and the rate of an increase in the overhead wire voltage at a predetermined time is equal to or higher than the predetermined threshold value, in combination with the prediction based on the threshold value of the overhead wire voltage and the rate of an increase in the overhead wire voltage.

Figure 7:
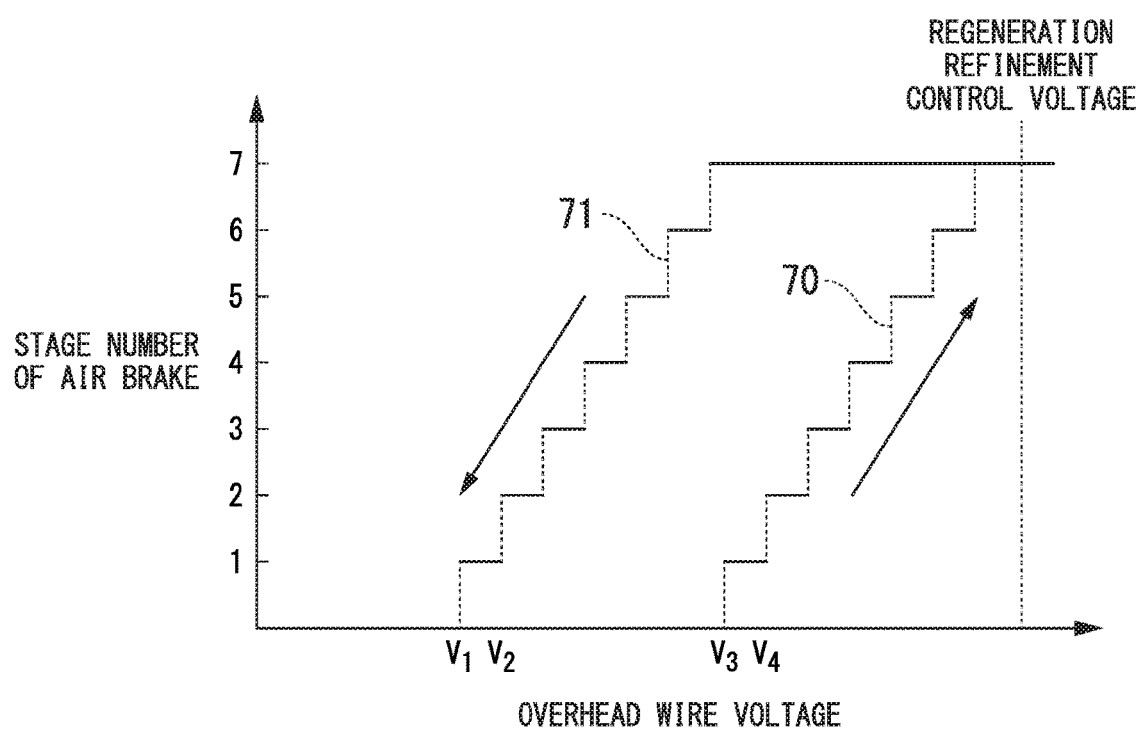
FIG. 7 is a third diagram illustrating an operation of the brake control device according to the second embodiment of the present invention.

FIG. 7 is a third diagram illustrating the operation of the brake control device according to the second embodiment of the present invention.

FIG. 7 is a diagram illustrating an example of a method of determining the stage number in the air brake output determination unit 102A when the regeneration invalidation prediction unit 107 predicts the occurrence of regeneration invalidation.

In FIG. 7, the vertical axis indicates the stage number of the air brake and the horizontal axis indicates the overhead wire voltage. The air brake output determination unit 102A acquires the prediction result of the occurrence of the regeneration invalidation and the value of the overhead wire voltage from the regeneration invalidation prediction unit 107. Hereinafter, it is assumed that the prediction result is a result indicating that the regeneration invalidation will occur. First, an operation in a case in which the stage number of the air brake increases will be described. It is assumed that the stage number of the air brake is currently "stage 0". In this case, when the overhead wire voltage exceeds $V_3$ from a state in which the overhead wire voltage is equal to or smaller than $V_3$, the air brake output determination unit 102A determines the stage number of the air brake to be "stage 1". When the overhead wire voltage further increases from this state and exceeds $V_4$, the air brake output determination unit 102A determines the stage number of the air brake to be "stage 2". Thereafter, similarly, the air brake output determination unit 102A increases the stage number of the air brake in stages according to an increase in the overhead wire voltage according to a right side graph 70 of FIG. 7.

Next, an operation in a case in which the stage number of the air brake is lowered will be described. It is assumed that the current stage number of the air brake is "stage 2". In this state, when the overhead wire voltage becomes lower than $V_2$ from a state in which the overhead wire voltage is equal to or higher than $V_2$, the air brake output determination unit 102A determines that the stage number of the air brake is "stage 1". When the overhead wire voltage is further lowered from this state and becomes lower than $V_1$, the air brake output determination unit 102A determines the stage number of the air brake to be "stage 0".

By providing a hysteresis width in the overhead wire voltage for determining the stage number of the air brake in this way, it is possible to prevent the control from becoming unstable due to several times of switching of the determination as to whether the stage number of the air brake is, for example, "stage 2" or "stage 1" according to a variation in the overhead wire voltage due to a detection error or the like.

Next, a flow of the brake control process according to the second embodiment will be described.

Figure 8:
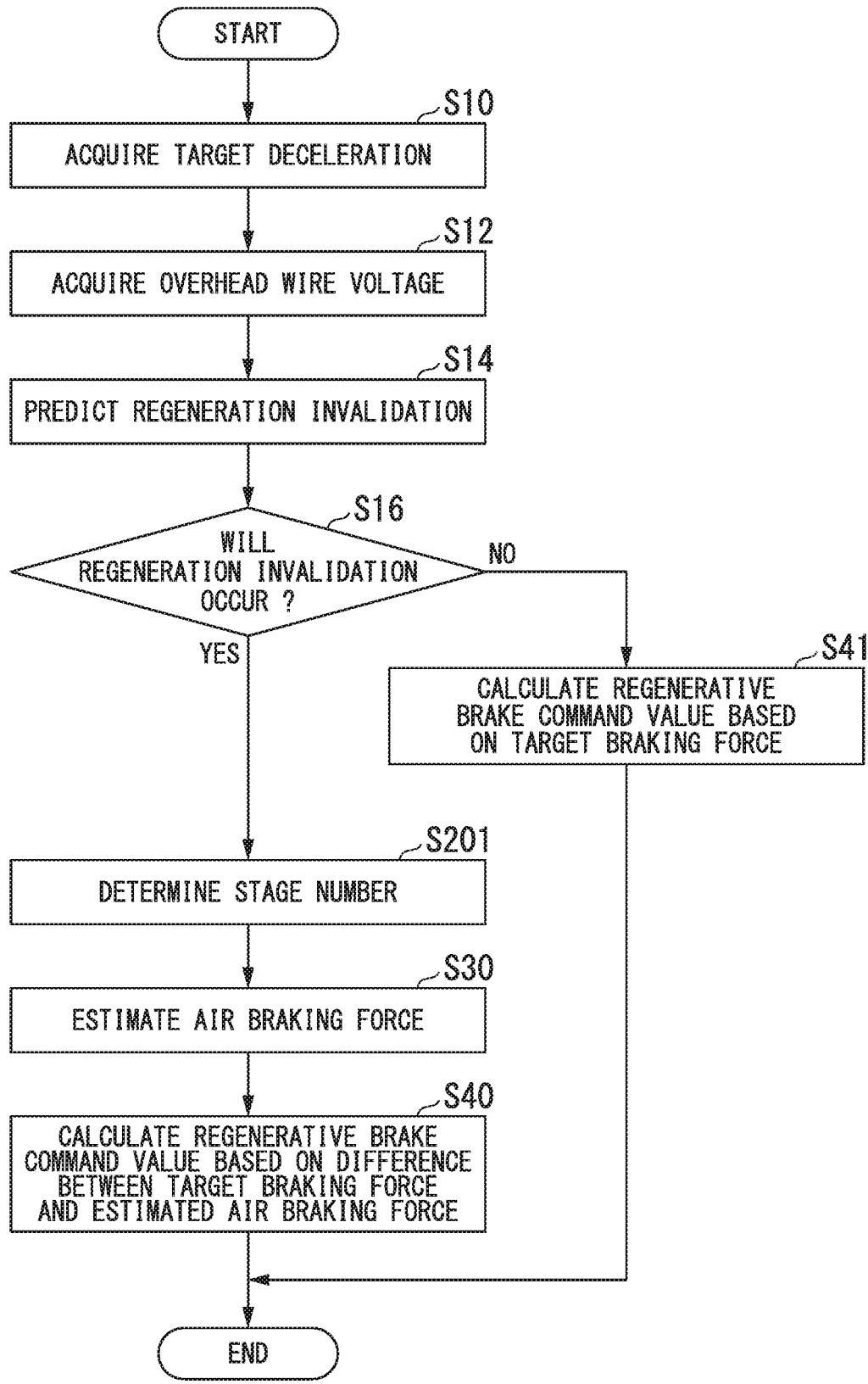
FIG. 8 is a flowchart illustrating an example of control of the brake control device according to the second embodiment of the present invention.

FIG. 8 is a flowchart illustrating an example of control of the brake control device according to the second embodiment of the present invention.

Processes that are the same as those in the flowchart of FIG. 3 are denoted by the same reference numerals and will be briefly described. It is assumed that the speed control calculation unit 100 has calculated a minus acceleration (target deceleration) for a reason such as approach to a stopping station. The speed control calculation unit 100 outputs the calculated target deceleration to the brake control unit 101. In the brake control unit 101A, the air brake output determination unit 102A and the regenerative brake control unit 104 acquire the target deceleration (step S10). In the regenerative brake control unit 104, the target braking force calculation unit 105 calculates the target braking force according to the target deceleration.

Then, the regeneration invalidation prediction unit 107 acquires a value of the overhead wire voltage from the inverter 11 (step S12). Then, the regeneration invalidation prediction unit 107 predicts whether or not the regeneration invalidation occurs on the basis of the value of the overhead wire voltage (step S14). For example, when the difference between the acquired value of the overhead wire voltage and the threshold value at which the regeneration refinement control is started falls within a predetermined range, the regeneration invalidation prediction unit 107 predicts that the regeneration invalidation will occur. For example, when the difference between the acquired value of the overhead wire voltage and the threshold value at which the regeneration refinement control is started does not fall within the predetermined range, the regeneration invalidation prediction unit 107 predicts that no regeneration invalidation will occur. The regeneration invalidation prediction unit 107 outputs a prediction result to the air brake output determination unit 102A.

When it is predicted that the regeneration invalidation will occur (step S16; Yes), the air brake output determination unit 102A determines the stage number of the air brake (step S201). For example, a storage unit (not illustrated) stores the correspondence relationship between the overhead wire voltage and the stage number of the air brake illustrated in FIG. 7, and the air brake output determination unit 102A determines the stage number on the basis of this correspondence relationship and the regeneration invalidation prediction unit 107. For example, the correspondence relationship between the overhead wire voltage and the stage number of the air brake illustrated in FIG. 7 is determined for each range of the target deceleration, and the air brake output determination unit 102A may be configured to read the correspondence relationship between the overhead wire voltage and the stage number of the air brake associated with the target deceleration acquired from the speed control calculation unit 100 from the storage unit. The air brake output determination unit 102A outputs the determined stage number to the air braking force estimation unit 103. The air brake output determination unit 102A controls the multistage relay valve 12 according to the determined stage number and starts the operation of the air brake in advance.

Then, the air braking force estimation unit 103 estimates the air braking force according to the stage number acquired from the air brake output determination unit 102A (step S30). For example, the air braking force estimation unit 103 obtains the estimated air braking force according to Equations (1) and (2) described above, as in the first embodiment. The air braking force estimation unit 103 outputs the obtained estimated air braking force to the regenerative brake control unit 104.

In the regenerative brake control unit 104, the difference calculation unit 106 subtracts the estimated air braking force from the target braking force to obtain a difference therebetween. When the difference is positive, the regenerative brake control unit 104 calculates a regenerative brake command value for obtaining the braking force indicated by the difference on the basis of the difference (step S40). The regenerative brake control unit 104 outputs the regenerative brake command value to the inverter 11 such that the regenerative brake is operated. A relationship between the target braking force and the stage number of the air brake when it is predicted that the regeneration invalidation will occur (an abnormal state), or the like is as described with reference to FIG. 6.

On the other hand, when it is predicted that no regeneration invalidation will occur (step S16; No), the air brake output determination unit 102A outputs the stage number "stage 0" of the air brake to the air braking force estimation unit 103. The air braking force estimation unit 103 outputs the value "0" of the estimated air braking force to the regenerative brake control unit 104 on the basis of the stage number "stage 0". In the regenerative brake control unit 104, the difference calculation unit 106 subtracts the estimated air braking force from the target braking force to obtain a difference therebetween. Since the estimated air braking force is "0", the regenerative brake control unit 104 calculates a regenerative brake command value so that the target braking force based on the target deceleration calculated by the target braking force calculation unit 105 is obtained (step S41). The regenerative brake control unit 104 outputs the regenerative brake command value to the inverter 11 such that the regenerative brake is operated. In this case, the air brake does not operate and only the regenerative brake operates. The relationship between the target braking force and the stage number of the air brake in a case in which it is predicted that no regeneration invalidation will occur (a normal state), or the like is as described with reference to FIG. 5.

Thus, in the second embodiment, a likelihood of the occurrence of regeneration invalidation is predicted from the state of the overhead wire voltage, and the output of the air brake is performed on the basis of a result of the prediction. Accordingly, in a case in which it can be predicted that the regeneration invalidation will occur, since the air brake is used only at the time of abnormality occurrence in which the regeneration invalidation is likely to occur, an effect of curtailment of abrasion of the brake pads can be obtained, in addition to the effects of the first embodiment. In a case in which it can be predicted that no regeneration invalidation will occur, it is not necessary to perform the control of the air brake, and therefore, it is possible to reduce a processing cost. From the viewpoint of energy saving or prevention of abrasion of the brake pads, there is a need for more effective utilization of the regenerative brake. However, according to the second embodiment, it is possible to satisfy such a need by setting operating conditions of the regeneration invalidation prediction unit 107 or the air brake output determination unit 102A so that the regenerative brake is used as preferentially as possible while preventing the regeneration invalidation.

Third Embodiment

Next, a brake control device for a train according to a third embodiment of the present invention will be described with reference to FIGS. 9 to 10.

Figure 9:
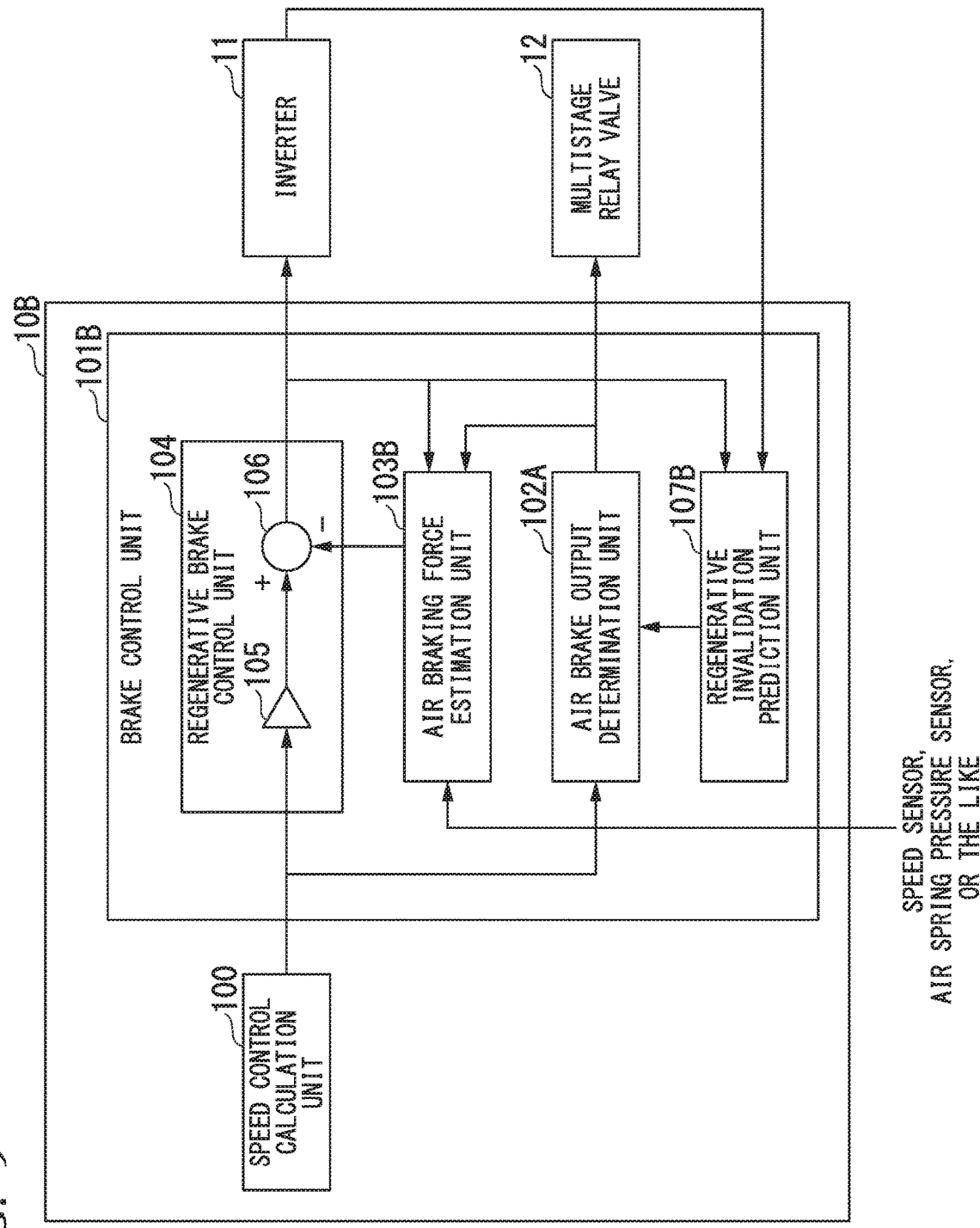
FIG. 9 is a functional block diagram illustrating an example of a brake control device according to a third embodiment of the present invention.

FIG. 9 is a functional block diagram illustrating an example of the brake control device according to the third embodiment of the present invention.

In a configuration according to the third embodiment, functional units that are the same as the functional units constituting the automatic train-driving device 10 according to the first embodiment of the present invention and the automatic train-driving device 10A according to the second embodiment are denoted by the same reference numerals, and description thereof will be omitted.

An automatic train-driving device 10B in the third embodiment includes a speed control calculation unit 100 and a brake control unit 101B. The brake control unit 101B includes an air brake output determination unit 102A, an air braking force estimation unit 103B, a regenerative brake control unit 104, and a regeneration invalidation prediction unit 107B. The regenerative brake control unit 104 includes a target braking force calculation unit 105 and a difference calculation unit 106.

The brake control unit 101B is different from those of the first embodiment and the second embodiment in that the brake control unit 101B includes the air braking force estimation unit 103B and the regeneration invalidation prediction unit 107B.

The air braking force estimation unit 103B estimates the air braking force on the basis of an acceleration of the train and a pulling force of a motor related to the regenerative brake. Specifically, the air braking force estimation unit 103B calculates the estimated air braking force according to the following equation, for example.

$$\text{Train weight} \times \text{Acceleration} = \text{Motor pulling force} - \text{Traveling resistance} \quad (3)$$

This equation may be modified to $$\text{Traveling resistance} = \text{Motor pulling force} - \text{Train weight} \times \text{Acceleration} \quad (4)$$

The following values are substituted for respective terms on the right side to determine the traveling resistance. First, for the motor pulling force, a command value to the inverter 11 or an effective pulling force output from the inverter 11 is used. The motor pulling force corresponds to the regenerative braking force. For the train weight, a defined weight of the train, a train weight expected from an air spring pressure included in the train, or the like is used. For the acceleration, a value obtained by differentiating a train speed measured by the speed sensor included in the train or a measured value of the acceleration sensor included in the train is used. The traveling resistance obtained by Equation (4) is the estimated air braking force.

The regeneration invalidation prediction unit 107B compares the value of the overhead wire voltage obtained from the inverter 11 with a predetermined threshold value to predict the occurrence of regeneration invalidation. In this case, the regeneration invalidation prediction unit 107B performs the prediction in consideration of a degree of increase in the overhead wire voltage due to the operation of the regenerative brake. More specifically, the regeneration invalidation prediction unit 107B predicts whether or not the regeneration invalidation occurs using a ratio of a power based on the regenerative brake command value output from the regenerative brake control unit 104 to a peak value of the regenerative power. For example, when the train approaches a deceleration start point, a predicted peak ($W_{max}$) of the regenerative power of the regenerative brake when the train speed is V [m/s] and a defined deceleration is B [m/s/s] can be obtained using the following equation.

$$W_{max} = \text{Train Weight} \times V \times B \quad (5)$$

Using this $W_{max}$, a ratio ($W/W_{max}$) of a regenerative power command value W included in the regenerative brake command value given to the inverter 11 to $W_{max}$ is obtained and used for prediction of the regeneration invalidation. For example, when the overhead wire voltage increases at a step at which $W/W_{max}$ is low, the regeneration invalidation is highly likely to occur when the regenerative power then further increases. On the other hand, even when the overhead wire voltage increases in a state in which $W/W_{max}$ is close to 1, the regenerative power then decreases, and therefore, it can be assumed that regeneration invalidation less likely to occur.

The regeneration invalidation prediction unit 107B predicts the occurrence of the regeneration invalidation in consideration of the likelihood of the regeneration invalidation based on $W/W_{max}$ in addition to the difference between the overhead wire voltage being monitored and a threshold value at which the regeneration refinement control is started (referred to as threshold value 1). For example, even when threshold value 2 lower than threshold value 1 is provided and the overhead wire voltage reaches threshold value 2, if $W/W_{max}$ at this time is equal to or greater than 0.9, it is predicted that regeneration invalidation will not occur. Alternatively, when the overhead wire voltage reaches threshold value 2 and $W/W_{max}$ at this time is equal to or smaller than 0.3, it is predicted that the regeneration invalidation will occur.

Further, the regeneration invalidation prediction unit 107B may use a database for a target speed profile (driving pattern) or gradient information included in the automatic train-driving device 10B with respect to the value of $W_{max}$. For example, when the gradient information indicates that a next downhill slope will come, the regeneration invalidation prediction unit 107B calculates $W_{max}$ according to a calculation equation taking a gradient into consideration (for example, a calculation equation including a gravity acceleration applied to the train on a downhill). Alternatively, the regeneration invalidation prediction unit 107B calculates $W_{max}$ according to Equation (5) using the speed of the train determined in the target speed profile. Accordingly, a more accurate value of $W_{max}$ can be obtained.

Although the example of the configuration in which both the air braking force estimation unit 103B and the regeneration invalidation prediction unit 107B are included has been described as the third embodiment, the air braking force estimation unit 103B, for example, can also be used in place of the air braking force estimation unit 103 in the configurations of the first embodiment and the second embodiment. In the configuration of the second embodiment, the regeneration invalidation prediction unit 107B can also be used in place of the regeneration invalidation prediction unit 107. In the configuration of the third embodiment, the air braking force estimation unit 103 of the first embodiment can also be used in place of the air braking force estimation unit 103B.

Next, a flow of the brake control process according to the third embodiment will be described.

Figure 10:
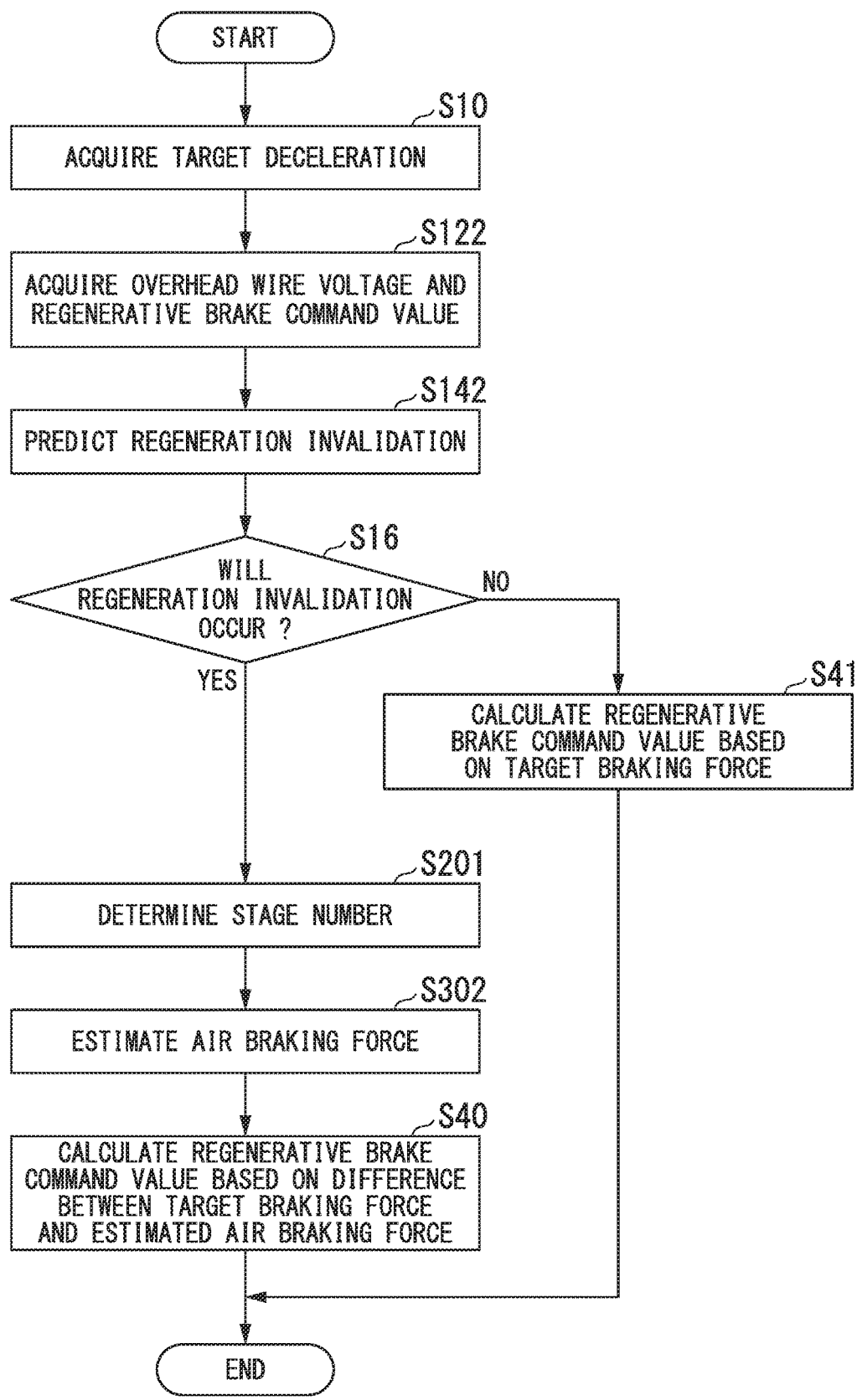
FIG. 10 is a flowchart illustrating an example of control of the brake control device according to the third embodiment of the present invention.

FIG. 10 is a flowchart illustrating an example of control of the brake control device according to the third embodiment of the present invention.

The same processes as those in the flowchart of FIG. 8 are denoted by the same reference numerals and will be briefly described. It is assumed that the speed control calculation unit 100 has calculated the target deceleration for a reason such as approach to a stopping station. The speed control calculation unit 100 outputs the calculated target deceleration to the brake control unit 101B. In the brake control unit 101B, the air brake output determination unit 102A and the regenerative brake control unit 104 acquire the target deceleration (step S10). In the regenerative brake control unit 104, the target braking force calculation unit 105 calculates the target braking force according to the target deceleration.

Then, the regeneration invalidation prediction unit 107B acquires the value of the overhead wire voltage and the regenerative brake command value from the inverter 11 (step S122). Then, the regeneration invalidation prediction unit 107B predicts whether or not the regeneration invalidation will occur on the basis of the overhead wire voltage and the ratio of the regenerative power command value (W) included in the regenerative brake command value to the peak value ($W_{max}$) of the regenerative power (step S142). For example, when $W/W_{max}$ is a small value even when the current overhead wire voltage is a sufficiently smaller value than the predetermined threshold value, the regeneration invalidation prediction unit 107B predicts that the regeneration invalidation will occur in a case in which it is considered that the overhead wire voltage will increase in future and reach a predetermined threshold value at the time of the peak of the regenerative power. On the other hand, even when the current overhead wire voltage is close to the predetermined threshold value, if $W/W_{max}$ is approximately 1, it is determined that there will be no increase in the overhead wire voltage in future and it is predicted that no regeneration invalidation will occur. $W_{max}$ can be calculated more accurately by using the target speed profile or the gradient information. The regeneration invalidation prediction unit 107B outputs the prediction result indicating whether or not the regeneration invalidation will occur to the air brake output determination unit 102A.

When it is predicted that the regeneration invalidation will occur (step S16; Yes), the air brake output determination unit 102A determines the stage number of the air brake (step S201). For example, the air brake output determination unit 102A determines the stage number on the basis of the correspondence relationship between the overhead wire voltage and the stage number of the air brake illustrated in FIG. 7. The air brake output determination unit 102A outputs the determined stage number to the air braking force estimation unit 103B. The air brake output determination unit 102A controls the multistage relay valve 12 according to the determined stage number and starts the operation of the air brake in advance.

Then, the air braking force estimation unit 103B estimates the air braking force according to the stage number obtained from the air brake output determination unit 102A (step S302). The air braking force estimation unit 103B obtains the estimated air braking force according to, for example, Equation (4) described above. The air braking force estimation unit 103B outputs the obtained estimated air braking force to the regenerative brake control unit 104.

In the regenerative brake control unit 104, the difference calculation unit 106 obtains the difference between the target braking force and the estimated air braking force, and the regenerative brake control unit 104 calculates the regenerative brake command value for compensating for an insufficient estimated air braking force on the basis of the difference (step S40). The regenerative brake control unit 104 outputs the regenerative brake command value to the inverter 11 such that the regenerative brake is operated.

On the other hand, if it is predicted that no regeneration invalidation will occur (step S16; No), the regenerative brake control unit 104 calculates the regenerative brake command value for obtaining the target braking force calculated by the target braking force calculation unit 105 (step S41). The regenerative brake control unit 104 outputs the regenerative brake command value to the inverter 11 such that the regenerative brake is operated.

According to the air braking force estimation unit 103B of the third embodiment, it is possible to estimate a more realistic air braking force for calculating the estimated air braking force using the acceleration of the train measured by a system including disturbance and the motor pulling force (the regenerative braking force).

According to the regeneration invalidation prediction unit 107B of this embodiment, it is possible to prevent the operation of the air brake in a situation in which it is not inherently necessary and to prevent lag of the start of the operation of the air brake by predicting not only a current value of the overhead wire voltage but also the change in the overhead wire voltage in the near future to predict the occurrence of regeneration invalidation.

Although the embodiment of the present invention has been described, the brake control unit 101, the brake control unit 101A, and the brake control unit 101B include a computer system therein. The above-described process is stored in a computer-readable recording medium in the form of a program and may be performed by a computer reading and executing this program. Here, the "computer-readable recording medium" refers to a magnetic disk, a magneto-optical disk, a CD-ROM, a DVD-ROM, a semiconductor memory, or the like. The computer program may be distributed to a computer through a communication line, and the computer receiving the distribution may execute the program.

Further, the program may be a program for realizing some of the above-described functions. Further, the program may be a program capable of realizing the above-described functions in combination with a program previously stored in the computer system, that is, a so-called differential file (differential program).

Although several embodiments of the present invention have been described, the embodiments have been presented by way of example and are not intended to limit the scope of the invention. Various omissions, substitutions, and changes can be made without departing from the gist of the invention. The air brake is an example of the mechanical brake. The train is an example of the moving body. The air brake output determination unit 102 and the air brake output determination unit 102A are examples of a mechanical brake output determination unit. The air braking force estimation unit 103, and the air braking force estimation unit 103B are examples of a mechanical braking force estimation unit. The brake control unit 101, the brake control unit 101A, and the brake control unit 101B are examples of the brake control device.

INDUSTRIAL APPLICABILITY

According to the brake control device, the brake control method, the train, and the program described above, it is possible to reduce the response lag of the air brake while using a control device that is lower in cost than a control device of the related art, and accordingly, to improve accuracy of tracking of the target speed in automatic driving.

REFERENCE SIGNS LIST 10, 10A, 10B Vehicle
100 Speed control calculation unit
101, 101A, 101B Brake control unit
102, 102A Air brake output determination unit
103, 103B Air braking force estimation unit
104 Regenerative brake control unit
105 Target braking force calculation unit
106 Difference calculation unit
107, 107B Regeneration invalidation prediction unit
11 Inverter
12 Multistage relay valve

The invention claimed is:

1. A brake control device, comprising:
 a mechanical brake output determination unit configured to determine a stage number of a braking force on the basis of a target deceleration of a moving body from one or a plurality of braking force stages output from a mechanical brake included in the moving body;
 a mechanical braking force estimation unit configured to estimate braking force of the mechanical brake corresponding to the stage number determined by the mechanical brake output determination unit; and
 a regenerative brake control unit configured to output a regenerative brake command value such that a regenerative brake included in the moving body outputs a braking force corresponding to a difference between target braking force based on the target deceleration and the braking force estimated by the mechanical braking force estimation unit.

2. The brake control device according to claim 1, wherein the mechanical braking force estimation unit is configured to estimate braking force of the mechanical brake on the basis of a model equation using characteristics information of the mechanical brake.

3. The brake control device according to claim 1, wherein the mechanical braking force estimation unit is configured to estimate the braking force of the mechanical brake on the basis of an acceleration of the moving body and a pulling force of a motor related to the regenerative brake.

4. The brake control device according to claim 1, further comprising:
 a regeneration invalidation prediction unit configured to perform prediction as to whether or not regeneration invalidation occurs,
 wherein the regenerative brake control unit is configured to output a regenerative brake command value for obtaining braking force corresponding to the target braking force when the regeneration invalidation prediction unit does not predict the occurrence of the regeneration invalidation, and to output a regenerative brake command value for obtaining braking force corresponding to a difference between the target braking force and the estimated braking force when the regeneration invalidation prediction unit predicts the occurrence of the regeneration invalidation.

5. The brake control device according to claim 4, wherein the regeneration invalidation prediction unit is configured to compare a voltage of an output destination of regenerative power of the regenerative brake with a predetermined threshold value and to predict that the regeneration invalidation occurs when a difference between the voltage of the output destination and the predetermined threshold value falls within a predetermined range.

6. The brake control device according to claim 5, wherein the regeneration invalidation prediction unit is configured to predict whether or not the regeneration invalidation occurs using a ratio of regenerative power based on the regenerative brake command value output by the regenerative brake control unit to a peak value of the regenerative power.

7. The brake control device according to claim 1, wherein the mechanical brake output determination unit is configured to determine the stage number according to a criterion determined so that the regeneration invalidation does not occur as a result of control of the regenerative brake in the regenerative brake control unit.

8. The brake control device according to claim 1, wherein the mechanical brake output determination unit is configured to determine the stage number when the target braking force is equal to or greater than a predetermined proportion to total braking force that is able to be output by the regenerative brake and the mechanical brake.

9. A train comprising the brake control device according to claim 1.

10. A brake control method, comprising:
 determining a stage number of a braking force on the basis of a target deceleration of a moving body from one or a plurality of braking force stages output from a mechanical brake included in the moving body;
 estimating braking force of the mechanical brake corresponding to the determined stage number; and
 outputting a regenerative brake command value such that a regenerative brake included in the moving body outputs a braking force corresponding to a difference between target braking force based on the target deceleration and the estimated braking force.

* * * * *